United States Patent
Melzer

(10) Patent No.: US 6,904,387 B2
(45) Date of Patent: Jun. 7, 2005

(54) HMI DEVICE AND METHOD FOR OPERATING A TECHNICAL FACILITY, AUTOMATION SYSTEM HAVING HMI DEVICE, AND COMPUTER PROGRAM PRODUCT HAVING PROGRAM FOR CARRYING OUT THE METHOD IN AN HMI DEVICE OR AUTOMATION SYSTEM

(75) Inventor: Roland Melzer, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 93 days.

(21) Appl. No.: 10/253,430

(22) Filed: Sep. 25, 2002

(65) Prior Publication Data

US 2003/0097189 A1 May 22, 2003

(30) Foreign Application Priority Data

Sep. 25, 2001 (EP) .......................................... 01122932

(51) Int. Cl.$^7$ ................................................ G06F 11/30
(52) U.S. Cl. ........................................ 702/185; 714/25
(58) Field of Search .............................. 702/59, 62, 68, 702/71, 80, 82, 90, 120, 183–185, 188; 714/26, 33, 55, 712, 715, 25; 709/202

(56) References Cited

U.S. PATENT DOCUMENTS

| | | | | |
|---|---|---|---|---|
| 4,228,537 A | * | 10/1980 | Henckels et al. ............. | 714/33 |
| 5,247,447 A | * | 9/1993 | Korncoff et al. ............ | 700/108 |
| 5,677,997 A | * | 10/1997 | Talatik ......................... | 706/45 |
| 5,841,960 A | * | 11/1998 | Ibusuki et al. ................ | 714/32 |
| 5,870,693 A | * | 2/1999 | Seng et al. ................... | 702/59 |
| 6,023,775 A | * | 2/2000 | Fujii ............................ | 714/48 |
| 6,219,719 B1 | * | 4/2001 | Graf ............................. | 710/1 |
| 6,353,899 B1 | * | 3/2002 | Martin et al. ................. | 714/57 |
| 6,460,070 B1 | * | 10/2002 | Turek et al. ................. | 709/202 |
| 6,560,726 B1 | * | 5/2003 | Vrhel et al. .................. | 714/55 |
| 2001/0025359 A1 | * | 9/2001 | Tanaka ....................... | 714/753 |

FOREIGN PATENT DOCUMENTS

| | | |
|---|---|---|
| DE | 197 41 959 A1 | 4/1999 |
| EP | 0 362 386 A1 | 4/1990 |
| EP | 0 424 869 A1 | 5/1991 |

* cited by examiner

Primary Examiner—Hal Wachsman
Assistant Examiner—Mohamed Charioui
(74) Attorney, Agent, or Firm—Sughrue Mion, PLLC

(57) ABSTRACT

A human machine interface (HMI) device (10) that detects (101) fault events (y, z) of the technical facility (2), that generates (107) technical operating actions (A . . . D), that automatically attributes (111) generated technical operating actions (B . . . B+m, C . . . C+n) to the fault events (y, z) associated therewith, and that automatically stores the operating actions with the attributions. In a further embodiment, the HMI device also compares current generated operating actions to stored operating actions and generates a query (116, 1116) for enabling the automatic execution of stored technical operating actions in the event of detection of the attributed fault event, if the generated operating actions and the current fault event correspond thereto.

13 Claims, 3 Drawing Sheets

HMI DEVICE AND METHOD FOR OPERATING A TECHNICAL FACILITY, AUTOMATION SYSTEM HAVING HMI DEVICE, AND COMPUTER PROGRAM PRODUCT HAVING PROGRAM FOR CARRYING OUT THE METHOD IN AN HMI DEVICE OR AUTOMATION SYSTEM

The following disclosure is based on European Patent Application No. 01122932.5, filed on Sep. 25, 2001, which is incorporated into this application by reference.

FIELD OF AND BACKGROUND OF THE INVENTION

The present invention relates to a human machine interface (HMI) device for operating at least one technical facility.

Technical facilities are operated increasingly with the aid of digital, programmable devices. These may often also represent an automation system and/or may be a component of such a system. Here, technical facilities are understood to be all types of technical devices and systems, arranged both individually and in an arrangement in which they are networked with one another to exchange data via a field bus, for example. Technical facilities are thus to be understood to include individual operating means in, for example, the framework of an industrial application, such as drives and processing machines. However, an entire production facility, in which, among other things, an entire technical process is performed using locally distributed operating means, for example, in a chemical installation, a manufacturing installation, or a processing installation, is also considered a technical facility.

The programmable devices used to control technical facilities have a continually increasing functional scope. In addition to decentralizing the operating means of such a device and networking the operating means via bus systems, the ease of operation of these devices is becoming more and more significant. Thus, distributed automation systems in particular may have special devices which form the interface between an operator and the automation system.

Such devices are generally referred to as HMI devices, HMI being an abbreviation of the term "human machine interface." Furthermore, it has become typical to refer to this device class as devices for "operator control and monitoring" of technical facilities. These devices, which are frequently situated upstream from devices used for direct control of a technical facility, have increasing functionality.

An overview of the functional scope of HMI devices may be obtained, for example, by examining Internet sites of Siemens AG, the Automation & Drives division, under http://www.ad.siemens.de/simatic/html_76/intro/hmi.htm or http://www.ad.siemens.de/hmi/html_00/index.htm. Furthermore, an abundance of product information about HMI devices and systems may be found by activating a typical Internet search engine, such as GOOGLE, under the address http://www.google.de, for example by entering a search concept such as "human machine interface."

The concept of an HMI device is to be understood as a generic concept and includes all of the components associated with this device group, e.g., "operator panels," which are often also referred to in abbreviated form as "OP." HMI devices have an increasing functionality and assume, for example, in a networked automation system, functions which may generally be considered as preprocessing and postprocessing of data of the technical facility to be controlled. Not only is an additional central control device, e.g., a stored-program controller (SPC), relieved in this way. Rather, through an HMI device, functions are made possible which significantly improve the comfort and the quality of operation by an operator, i.e., particularly the supervision of the unit to be operated and the correctness of operations.

Therefore, in many cases an HMI device provides at least an interactive overview and/or process image of the technical facility to be operated, which, among other things, may also be directly configured with the HMI device using special software. In this way, on the one hand, it is possible to provide purposeful selection of operating actions in order to transfer the technical facility into a respective desired state. On the other hand, it is also possible to provide purposeful display of reactions of the technical facility, largely in the form of measured values and signals. In this way, reliable observation of the state of the technical facility is ensured. In this regard, fault signals, which signal an undesired state of the technical facility and, as a rule, have the purposeful input of operating actions by an operator into the HMI device as a consequence, assume a special position. These operating actions are to influence the fault event of the technical facility which generated the fault signal in such a way that the technical facility assumes a desired state again if at all possible.

OBJECTS OF THE INVENTION

One object of the present invention is to provide an HMI device and a method for operating a technical facility which allow improved handling of fault events. A further object of the present invention is to provide an associated automation system and an associated computer program product.

SUMMARY OF THE INVENTION

These and other objects of the present invention are achieved by the features of the respective independent patent claims. According to one formulation, the invention is directed to a human machine interface device for operating at least one technical facility, which includes a first means for detecting fault events of the technical facility; a second means for generating technical operating actions; and a third means for automatically attributing generated technical operating actions to the associated fault events and automatically storing the operating actions with the attributions.

According to another formulation, the invention provides a human machine interface device having a first component that inputs fault event data indicative of at least one fault event of a technical facility; a second component that processes at least one fault response action input to the human machine interface device; a third component that processes the fault event data and the fault response action into association data that links the technical operating action as an available response to the fault event; a fourth component that stores the association data for retrieval; and a fifth component that retrieves and processes the association data from the fourth component in response to at least one of a further fault event or a further fault response action.

The invention additionally encompasses systems, methods and computer program products associated with the inventive human machine interface devices.

Using the advantageous attribution feature, the present invention provides for automated assignment of operating actions to the fault event(s) whose occurrence prompted the input of the corresponding operating actions into the HMI device by a machine operator.

In this way, it is possible to determine at any time, for example, in the context of facility monitoring, an operating log, or even a check of the operating personnel, which operating actions have been input into the HMI device, and thus ultimately acted on the technical facility, on the basis of the occurrence of a fault event. In the context of long-term observations, it may also be investigated, with respect to an identical fault event, which sequence of differing operating actions more rapidly and/or more effectively suppressed or repaired the effects of the fault event on the technical facility.

The activation of the automatic attribution may be initiated in practice by a machine operator, for example, by a manual input into the HMI device. This has the effect that all of the subsequent inputs of operating actions into the HMI device are automatically attributed to the current fault event. Depending on the application, the automatic attribution may be deactivated again by another input into the HMI device.

In an advantageous further embodiment of the present invention, stored technical operating actions are automatically carried out in the event the attributed fault event associated with them is detected.

The advantage of this embodiment of the invention is that the suitability of an HMI device for fault analysis and the subsequent fault correction are significantly improved. This is particularly advantageous for the use of inventive HMI devices in the industrial environment. In this way, the situation, which frequently occurs in practice, of the same operating actions having to be carried out by a machine operator on the HMI device, as a consequence of a known and repeatedly occurring fault event, may be avoided. In this way, on the one hand, the delay time until the operating actions for correcting the fault are generated may be significantly reduced. Furthermore, it may be ensured that a specific, known fault is always answered/combated with the same sequence of operating actions.

In a preferred embodiment of the present invention, in the event of detection of the attributed fault event, after a comparison of generated technical operating actions with stored operating actions, a query is generated as to whether it is desired by the user to enable the automatic performance of stored technical operating actions, if the generated operating actions and the current fault event correspond to the stored ones.

This embodiment offers the particular advantage that an operating reaction to a fault event, which must normally be performed manually by a machine operator, may be completely automated if desired, i.e., may run automatically, within an HMI device. This embodiment of the invention is particularly suited for repeating fault events whose effects are known and easily overviewed.

As one of many possible exemplary applications for the embodiment, the case will be considered in which, in an operating means in a technical facility which no longer functions completely reliably, a known fault event occurs sporadically at irregular intervals. The repeating, identical operating actions for resolving this fault event may advantageously be carried out automatically in this case until, for example, the operating means is replaced.

According to a further preferred embodiment of the present invention, technical operating actions are advantageously attributed to a fault event until a further fault event is detected. Additionally or alternatively, technical operating actions which are generated so that they are temporally linked may also advantageously be attributed to a single fault event.

It is particularly advantageous in these embodiments that the attribution is not only carried out automatically in this case, but is also automatically initiated and ended. No further type of manual operation by a machine operator is then necessary.

The computer program product according to the present invention is a commercial manifestation of the computer program which has software means for performing a method according to the present invention when the computer program is executed in an HMI device or an automation system. These may be recordings on typical data carriers such as diskettes, CDs, DVDs, hard drives, memory sticks, tapes, etc. However, files which may be stored in a computer server, downloaded with the aid of the Internet, for example, and then loaded into an HMI device and/or an automation system also represent a computer program product according to the present invention.

BRIEF DESCRIPTION OF THE DRAWINGS

The invention and further advantageous refinements of the invention are explained in more detail below with the aid of diagrammatic, preferred embodiments in the drawings, in which.

DETAILED DESCRIPTION OF THE PREFERRED EMBODIMENTS

Figure 1:
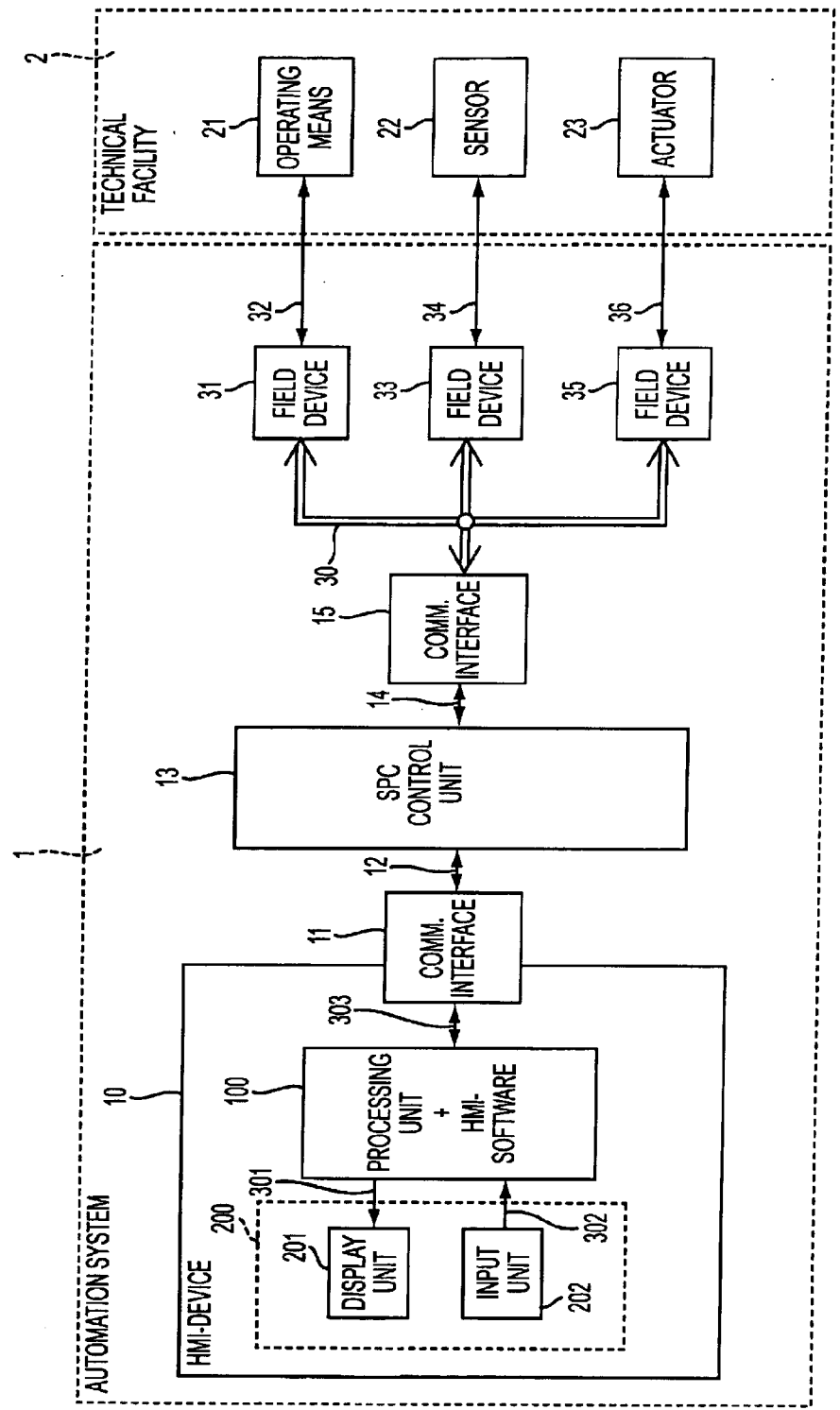
FIG. 1 shows a block diagram of an embodiment of an automation system according to the present invention, which has at least one HMI device for operating a technical facility.

FIG. 1 shows a block diagram of an embodiment of an automation system 1 according to the present invention, which has at least one HMI device 10 according to the present invention for operating a technical facility 2. HMI device 10 has a human-machine interface component 200, which has at least one display unit 201, e.g., an LCD display or a touch screen, and one input unit 202, e.g., a membrane keyboard, keypad, mouse pad, etc.

Furthermore, the HMI device has a processing unit 100, on which HMI software is executed. The HMI software is used for driving display unit 201 and input unit 202, which are connected to processing unit 100 via internal data interfaces 301 and 302. Furthermore, HMI software has the task of performing user-specific preprocessing and postprocessing, particularly of operating actions, measured values, and fault events.

Only a few examples of the large scope of functions which an HMI software computer program may have will be described, for exemplary purposes. Thus, for example, operating actions, measured values, and fault events may be entered by HMI software into an interactive process image and displayed on display unit 200. Furthermore, for example, operating actions, measured values, and fault events may be logged in a user-specific way and archived in suitable lists for later analysis. In addition, HMI software may be provided with editors, with which individually designed process images of the technical facility to be monitored and operated are configured.

In the embodiment illustrated in FIG. 1, HMI device 10 is connected via a communication interface 11 and an internal data bus 12 to a control unit 13. This unit may be a stored-program controller SPC, which has the task of actually controlling technical facility 2. For example, regulating algorithms for technical operating means of the technical facility may be carried out in control unit 13. If automation system 1 is used for process control of, for example, technical operating means in the chemical industry, recipe administration, batch controls and much more may be executed in control unit 13.

In the example in FIG. 1, a further communication interface 15 forms the transition between internal data bus 14 at the outlet of control unit 13 and a field bus 30. For example, bus systems such as field bus, Profibus, ethernet, industrial ethernet, FireWire, or even internal PC bus systems (PCI), etc., may be used as data networks which reach into the technical facility 2, which may not necessarily be limited to one single, compact location. This field bus connects, for example, so-called field devices to the control unit 13 and, by extension, also to HMI device 10 for exchanging data. Field devices are understood in the following as peripheral devices such as input/output assemblies, drives, actuators, sensors, and regulator or control units of all types. In the embodiment illustrated in FIG. 1, for example, a field device 31 is connected via an external data interface 32 to an operating means 21, for example, a drive of technical facility 2. Correspondingly, field devices 33, 35 are connected, for example, via external data interfaces 34, 36 to a sensor 22 and/or an actuator 23 of technical facility 2.

Figure 2:
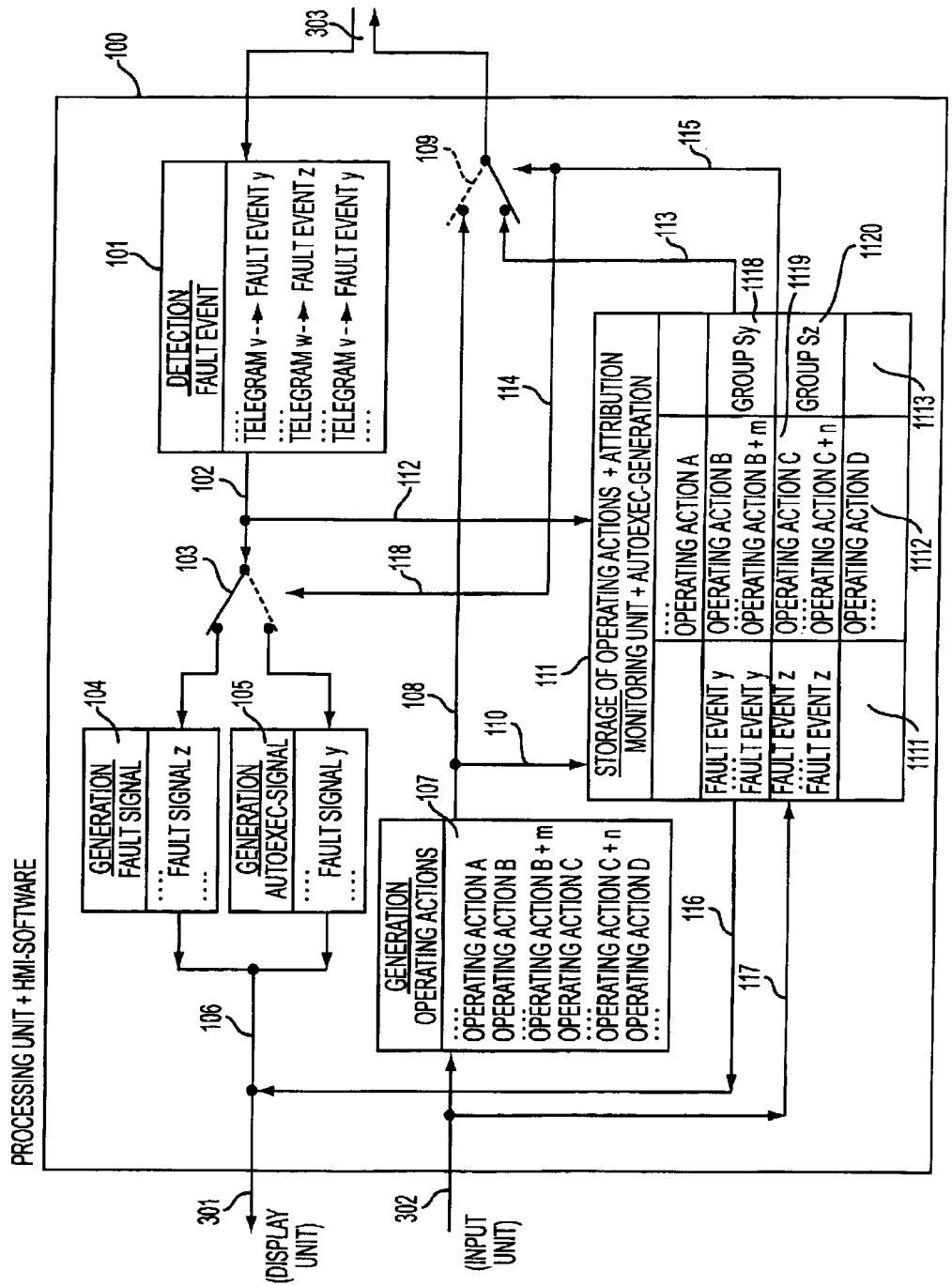
FIG. 2 shows a combined structure and flow diagram to explain a preferred embodiment of the processing unit of the HMI device according to the present invention and the method according to the present invention.

FIG. 2 shows a combined structure and flow diagram to explain a preferred embodiment of processing unit 100 of HMI device 10 according to the present invention and the method according to the present invention.

HMI device 10, which is used to operate at least one technical facility 2, has, according to the present invention, first means 101 for detecting fault events y, z of technical facility 2, second means 202, 107 for generating technical operating actions A . . . D and third means 111, 1111, 1112 for automatic attribution 1113 of generated technical operating actions B . . . B+m, C . . . C+n to associated fault events y, z and automatic storage of operating actions A . . . D with the attributions.

Processing unit 100 of HMI device 10 is, in the example of FIG. 2, supplied with fault events via internal data interface 303, preferably in the form of data telegrams. In function unit 101, continuous detection of incoming fault events of the technical facility is performed by the first means. In the example of FIG. 2, two fault events y and z were detected in the form of associated data telegrams v and w. In the exemplary embodiment of FIG. 2, the fault events are supplied to function units 104, 105 via a data relay 102 and a selection unit 103, whose mode of operation will be described in more detail below. These function units generate fault signals, which are supplied to display unit 201 via a further data relay 106 and are output there. Function unit 104 thereby generates a fault signal z associated with fault event z and function unit 105 generates a fault signal y for fault event y. The differences in the modes of operation of function units 104, 105 will be described in more detail below.

Figure 3:
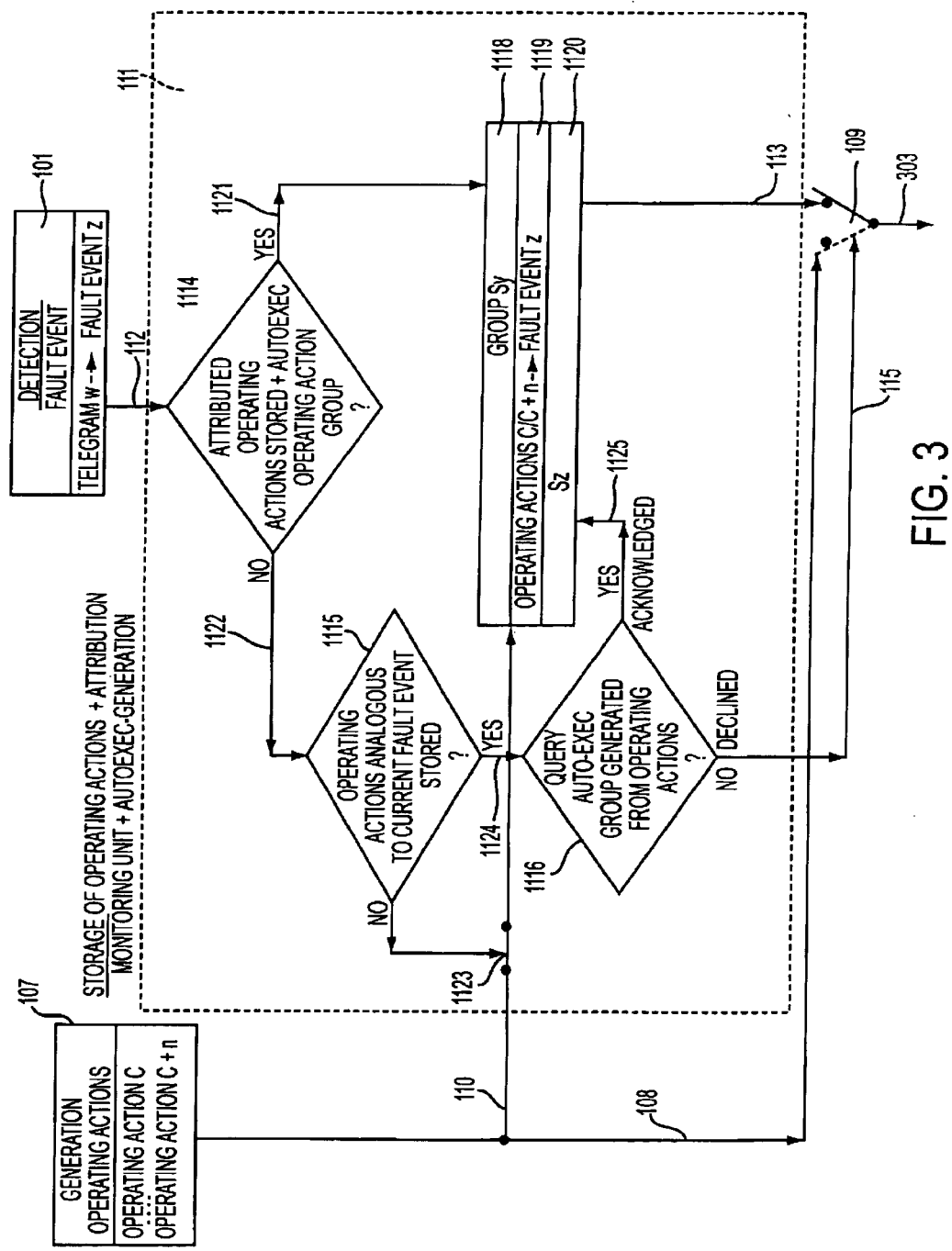
FIG. 3 shows a combined structure and flow diagram of an exemplary embodiment for a preferred functional unit of the present invention, with which a query for enabling the automatic performance of stored technical operating actions may be generated.

The function units, selection unit, and data relays already described, as well as all corresponding and further units which are cited in the further description of FIGS. 2 and 3, are advantageously components of HMI software and therefore preferably implemented using programming. Such HMI software may, for example, be the programs WinCC or UTAH of the firm Siemens AG. These types of HMI computer programs are executed in an HMI device or an automation system and are commercially available in the form of typical computer program products, such as program CDs, diskettes, program files downloadable via the Internet, etc.

If, following a fault signal, operations are performed by an operator via input 202, technical operating actions are generated therefrom in function unit 107, which embodies the second means. These operating actions are supplied to internal data interface 303 via a data relay 108 and a further selection unit 109, whose modes of operation will also be described in more detail below. From this interface, the operating actions reach control unit 13, which initiates appropriate state changes in the respective field devices affected, via internal data bus 12.

In the example shown in FIG. 2, function unit 107 generates individual operating actions A and D, a first group of associated operating actions B to B+m and a second group of associated operating actions C to C+n. For the further explanations, it is assumed that A and D are quasi-spontaneous operating actions of an operator, while first group of operating actions B to B+m was undertaken as a consequence of fault event y and second group of operating actions C to C+n was undertaken as a consequence of fault event z. The effects of the fault event on the technical facility are to be preferably corrected, or at least limited, with the aid of these operating action groups.

These operating actions are supplied via a data relay 110 to a function unit 111, embodying the third means, while this function unit is also supplied with the current fault events from function unit 101 via a further data relay 112. This function unit 111 produces the inventive automatic attribution of generated technical operating actions to the fault events associated therewith and the automatic storage of the operating actions with their attributions.

In the example shown in FIG. 2, function unit 111 has the title "STORAGE of operating actions+attribution, monitoring unit+AutoExec generation." For example, operating actions B to B+m, which form the first group, are automatically attributed to associated fault event y, and operating actions C to C+n, which form the second group, are automatically attributed to associated fault event z, and are preferably stored in the form of operating action-fault event groups "group Sy" and "group Sz."

In addition to operating action-fault event groups Sy, Sz, all operating actions of the operator are recorded, in order to, for example, provide the functionality "UNDO." In this case, not only are the keystrokes or mouse clicks of the operator recorded, but also, advantageously, the functions of the HMI device and/or of the HMI software executed therewith, such as image selection on the display unit, input of a variable value at the input unit, and so forth.

According to an advantageous further embodiment of the present invention, stored technical operating actions may be automatically performed in the event of detection of the attributed fault event associated therewith.

If a fault event is detected by function unit 101 more than once, e.g., in FIG. 2 telegram v occurs a second time, so that fault event y is also detected a second time, then, if desired by the user, stored technical operating actions B to B+m associated therewith may also be performed automatically. In this case, selection units 103, 109 are transferred into the state indicated by dashed lines by function unit 111 via data relays 115, 118. This has the consequence that current operating actions are not output by function unit 107 via data relay 108, but rather operating action group Sy is automatically output via data relay 113 at data interface 303. To inform the user about these events, a special fault signal y, referred to as an "AutoExec signal," is output at display unit 201 via function unit 105.

In a particularly advantageous further embodiment of the present invention, there is also a comparison of currently generated technical operating actions to stored operating actions, and generation of a query about enabling the automatic execution of stored technical operating actions in the event of detection of the attributed fault event, if the generated operating actions and the current fault event correspond thereto.

This embodiment has the separate advantage that greater efficiency in operation may be produced, particularly during recurring fault events. For this purpose, the operating actions of the operator which are performed after fault events arise are recorded in the background in the HMI software. If it is determined in function unit 111 that identical operating actions were performed multiple times for a fault event, this is communicated to the operator. Preferably, the HMI software in the processing unit suggests to the operator in this case that it perform these operating actions automatically in the future. If the operator confirms this, the fault correction is performed automatically in the future by the HMI device. It is particularly advantageous in this case that the HMI software suggests on its own that it perform reoccurring operating actions of the operator automatically in the future.

If, in the example shown in FIG. 2, it is established by a monitoring unit in function unit 111 that, for example, 1. fault event z was detected by function unit 101 and
2. operating actions C . . . C+n were generated, by an operator via function unit 107, which
3. at least partially correspond to the operating actions stored in function unit 107 and attributed to fault event z from associated "group Sz" of operating actions C to C+n, then a query about enabling the automatic execution of the technical operating actions C . . . C+n stored in 111 is generated. This is advantageously performed by outputting a corresponding query on display unit 201 via data relay 116. If the query is positively acknowledged by the operator, operating actions C to C+n associated therewith, i.e., group Sz, are automatically executed via data relay 113 either at that time or in the future, i.e., in the event of another occurrence of the attributed fault event, by means of an appropriate enabling signal transmitted via data relay 117.

The third means 111 of HMI device 10 are preferably designed in such a way that they attribute technical operating actions to a fault event until a further fault event is detected. In a further embodiment of HMI device 10, the third means 111 may also be designed in such a way that they attribute to a single fault event those technical operating actions generated such that they are temporally linked. Using these refinements of the present invention, sets of operating actions which are linked and associated with a single fault event may be grouped together automatically.

FIG. 3 shows a combined structure and flow diagram of an exemplary embodiment for a preferred function unit 111 of the present invention, with which a query for enabling the automatic execution of stored technical operating actions may be generated.

In the example shown in FIG. 3, a fault event z is detected by function unit 101, and this is communicated via data relay 112 to function unit 111. Furthermore, it is assumed that operating actions C to C+n are prompted by an operator via function unit 107 due to fault event z, and these operating actions are communicated via data relay 110 to function unit 111 and/or are relayed via data relay 108 to selection unit 109.

Function unit 101 has a first query unit 1114. This unit checks whether operating actions already attributed to current fault event z are stored and whether an automatic execution of these operating actions has been enabled, i.e., whether an AutoExec operating action group exists.

In the example shown in FIG. 3, it is assumed that initially only an attributed AutoExec "group Sy" 1118 enabled for automatic execution is stored for fault event y. In such a case, if fault event y were to occur, the automatic execution of group Sy would be activated via data relays 1121, 113 and selection unit 109.

In the example shown in FIG. 3, it is assumed that an automatic execution of attributed operating actions for current fault event z has not yet been enabled. In a second query unit 1115, it is checked whether at least operating actions attributed to the current fault event z and corresponding to at least one of the currently existing operating actions C to C+n are stored. In the negative case, "no," current operating actions C to C+n are supplied via data relay 110 and an enabling unit 1123 to function unit 111 for the purposes of storage of and attribution of the operating actions to fault event z. This is illustrated in FIG. 3 by a corresponding entry in cell 1119.

In the positive case, "yes," i.e., in the event of the existence of already stored operating actions, which are therefore attributed to fault event z and are at least partially identical to the current operating actions, a query to the user is generated via a third query unit 1116. If the query is acknowledged by the user with a "yes," an AutoExec "group Sz" of operating actions C to C+n is applied. This is illustrated in FIG. 3 by data relay 1125 and cell 1120. If fault event z occurs again in the future, the automatic execution of this group Sz of associated operating actions is enabled by the HMI device and/or the HMI software via first query unit 1114 and data relay 1121.

However, if the query is declined by an operator with "no," selection unit 109 is controlled via a data relay 115 in such a way that currently existing operating actions C to C+n are output by function unit 107 via internal data interface 303, while bypassing function unit 111.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A human machine interface device for operating at least one technical facility, comprising:
    first means for detecting fault events of the technical facility,
    second means for generating technical operating actions, and
    third means for automatically attributing generated technical operating actions to the associated fault events and automatically storing the operating actions with the attributions,
    wherein the generated technical operating actions are for correcting the fault events; and means for comparing generated technical operating actions to stored operating actions, and for generating a query for enabling the automatic execution of stored technical operating actions in the event of detection of the attributed fault event, if the generated operating actions and the current fault event correspond to the stored operating actions and the attributed fault event.

2. The human machine interface device according to claim 1, further comprising fourth means for automatically executing stored technical operating actions in the event of detection of the attributed fault event associated therewith.

3. The human machine interface device according to claim 1, wherein the third means attributes technical operating actions to the current fault event until a further fault event is detected.

4. The human machine interface device according to claim 1, wherein the third means attributes technical operating actions that are generated as being temporally linked to a single fault event.

5. A method for operating a technical facility comprising:
continuously detecting fault events of the technical facility,
automatically attributing generated technical operating actions to the detected fault events, and
automatically storing the operating actions with their attributions,
wherein the generated technical operating actions are for correcting the fault events;
comparing the generated technical operating actions to the stored operating actions, and
generating a query for enabling an automatic execution of the stored technical operating actions in the event of detection of the attributed fault event, if the generated operating actions and the current fault event correspond to the stored technical operating actions and the attributed fault event.

6. The method according to claim 5, further comprising:
automatically executing the stored technical operating actions in the event of detection of the attributed fault event associated therewith.

7. The method according to claim 5, wherein the technical operating actions are attributed to a current fault event until a further fault event is detected.

8. The method according to claim 5, wherein technical operating actions that are generated such that they are temporally linked are attributed to a single fault event.

9. A human machine interface device, comprising:
a first component inputting fault event data indicative of at least one fault event of a technical facility;
a second component processing at least one fault response action input to the human machine interface device;
a third component processing the fault event data from said first component and the fault response action from said second component into association data that links the fault response action as an available response to the fault event;
a fourth component storing the association data for retrieval; and
a fifth component retrieving and processing the association data from said fourth component in response to at least one of a further fault event or a further fault response action,
wherein:
said first component inputs additional fault event data indicative of at least one additional fault event of the technical facility;
said second component processes at least one additional fault response action input to the human machine interface device;
said third component processes the additional fault event data from said first component and the additional fault response action from said second component into additional association data that links the additional fault response action as an additional available response to the additional fault event;
said fourth component stores the additional association data for retrieval;
said fifth component retrieves and processes the additional association data from said fourth component in response to at least one of the further fault event or the further fault response action; and
said fifth component selects between the association data and the additional association data to generate a prompt for either the available response or the additional available response as a preferred response to the further fault event.

10. The human machine interface device according to claim 9, further comprising a user display displaying the prompt.

11. The human machine interface device according to claim 9, further comprising a communication link outputting the prompt to the technical facility.

12. An automation system comprising:
at least one control unit which acts on a technical facility; and
at least one HMI device connected to or integrated in the control unit, comprising:
first means for detecting fault events of the technical facility,
second means for generating technical operating actions, and
third means for automatically attributing generated technical operating actions to the associated fault events and automatically storing the operating actions with the attributions,
wherein the generated technical operating actions are for correcting the fault events; and
fourth means for comparing generated technical operating actions to stored operating actions, and for generating a query for enabling the automatic execution of stored technical operating actions in the event of detection of the attributed fault event, if the generated operating actions and the current fault event correspond to the stored operating actions and the attributed fault event.

13. A computer program product having a computer program, which is executed in a human machine interface or an automation system, and which has software for performing a method comprising:
continuously detecting fault events of the technical facility,
automatically attributing generated technical operating actions to the respective fault events, and
automatically storing the operating actions with their attributions,
wherein the generated technical operating actions are for correcting the fault events;
comparing the generated technical operating actions to the stored operating actions, and
generating a query for enabling an automatic execution of the stored technical operating actions in the event of detection of the attributed fault event, if the generated operating actions and the current fault event correspond to the stored technical operating actions and the attributed fault event.

* * * * *